United States Patent
Jung et al.

(10) Patent No.: US 12,407,054 B2
(45) Date of Patent: Sep. 2, 2025

(54) TRANSFER JIG CONFIGURED TO LOAD BATTERY PACK IN BATTERY RACK AND BATTERY PACK LOADING METHOD USING THE SAME

(71) Applicant: LG ENERGY SOLUTION, LTD., Seoul (KR)

(72) Inventors: Young Sung Jung, Daejeon (KR); Seung Hee Chae, Daejeon (KR); Wang Seok Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 756 days.

(21) Appl. No.: 17/638,998

(22) PCT Filed: Mar. 16, 2021

(86) PCT No.: PCT/KR2021/003214
§ 371 (c)(1),
(2) Date: Feb. 28, 2022

(87) PCT Pub. No.: WO2021/194146
PCT Pub. Date: Sep. 30, 2021

(65) Prior Publication Data
US 2022/0336905 A1    Oct. 20, 2022

(30) Foreign Application Priority Data
Mar. 25, 2020  (KR) .................. 10-2020-0036003

(51) Int. Cl.
*H01M 50/256*    (2021.01)
*H01M 50/20*    (2021.01)
(Continued)

(52) U.S. Cl.
CPC ......... *H01M 50/256* (2021.01); *H01M 50/20* (2021.01); *H01M 50/204* (2021.01); *H01M 50/244* (2021.01)

(58) Field of Classification Search
CPC ........... H01M 10/0404; H01M 50/244; H01M 50/204; H01M 10/0486
See application file for complete search history.

(56) References Cited

U.S. PATENT DOCUMENTS

| | | | |
|---|---|---|---|
| 5,610,802 A | 3/1997 | Eidler et al. | |
| 2009/0139940 A1* | 6/2009 | Maniscalco | H01M 50/204 211/49.1 |

(Continued)

FOREIGN PATENT DOCUMENTS

| | | |
|---|---|---|
| CN | 102320235 A | 1/2012 |
| CN | 107863473 A | 3/2018 |

(Continued)

OTHER PUBLICATIONS

Extended European Search Report for European Application No. 21774570.2, dated May 22, 2024.
(Continued)

*Primary Examiner* — Imran Akram
(74) *Attorney, Agent, or Firm* — Birch, Stewart, Kolasch & Birch, LLP

(57) ABSTRACT

A transfer jig configured to load a battery pack in a battery rack and a battery pack loading method using the same, includes plurality of vertical frames spaced apart from each other by a predetermined distance and a plurality of L-shaped horizontal frames located spaced apart from each other by a predetermined distance in a height direction of each of the vertical frames so as to form a receiving space configured to allow each of the battery packs to be received therein, wherein the transfer jig includes a pair of side frames spaced apart from each other by a predetermined
(Continued)

distance; a plurality of front frames located perpendicular to the side frames; and a plurality of guide rollers, and a battery pack loading method using the same.

11 Claims, 4 Drawing Sheets

(51) Int. Cl.
*H01M 50/204* (2021.01)
*H01M 50/244* (2021.01)

(56) References Cited

U.S. PATENT DOCUMENTS

| | | |
|---|---|---|
| 2012/0315117 A1 | 12/2012 | Gilland et al. |
| 2016/0226034 A1 | 8/2016 | Seok et al. |
| 2018/0186580 A1 | 7/2018 | Zanoni et al. |
| 2020/0067329 A1 | 2/2020 | Liu et al. |

FOREIGN PATENT DOCUMENTS

| | | |
|---|---|---|
| CN | 109860684 A | 6/2018 |
| CN | 208484671 U | 2/2019 |
| CN | 109501761 A | 3/2019 |
| JP | 53-74629 U | 6/1978 |
| JP | 4-8828 A | 1/1992 |
| JP | 6-283151 A | 10/1994 |
| JP | 9-220937 A | 8/1997 |
| JP | 2640010 B2 | 8/1997 |
| JP | 10-326605 A | 12/1998 |
| JP | 11-505997 A | 5/1999 |
| JP | 2002-274790 A | 9/2002 |
| JP | 2017-73270 A | 4/2017 |
| KR | 10-2009-0047566 A | 5/2009 |
| KR | 10-0960098 B1 | 5/2010 |
| KR | 10-1158796 B1 | 6/2012 |
| KR | 10-2016-0094235 A | 8/2016 |
| KR | 10-2017-0047539 A | 5/2017 |
| KR | 10-2017-0112143 A | 10/2017 |
| KR | 10-1799537 B1 | 11/2017 |
| KR | 20-0487164 Y1 | 8/2018 |

OTHER PUBLICATIONS

International Search Report (PCT/ISA/210) issued in PCT/KR2021/003214 mailed on Jun. 21, 2021.

* cited by examiner

[FIG. 1]
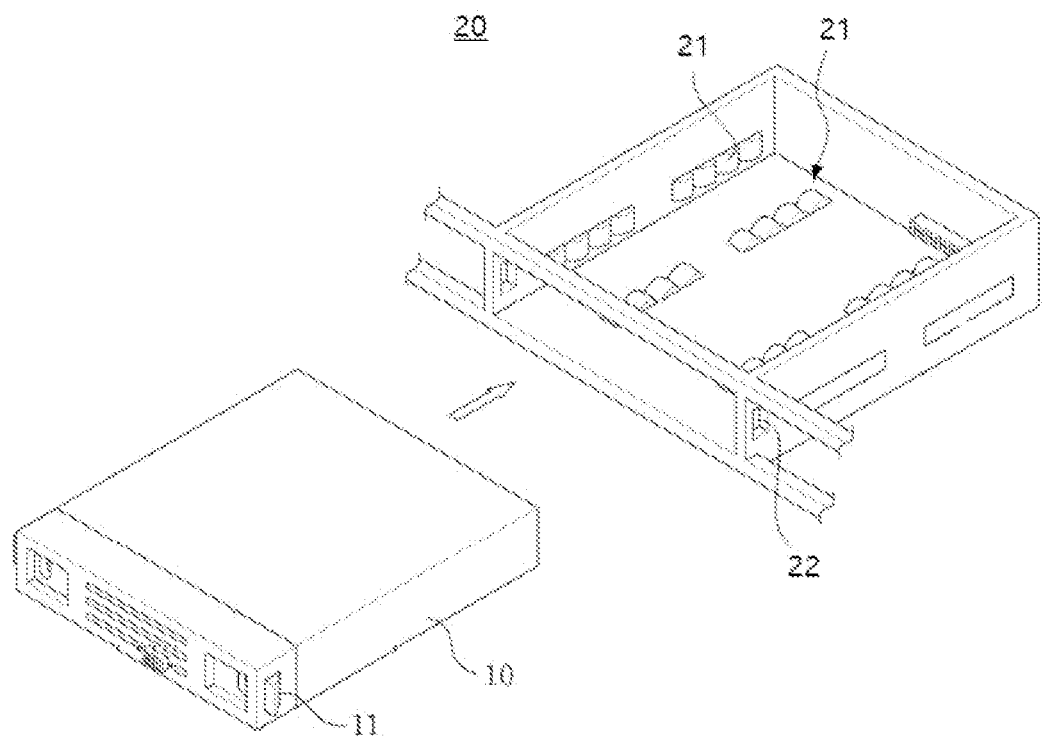
Conventional Art

[FIG. 2]
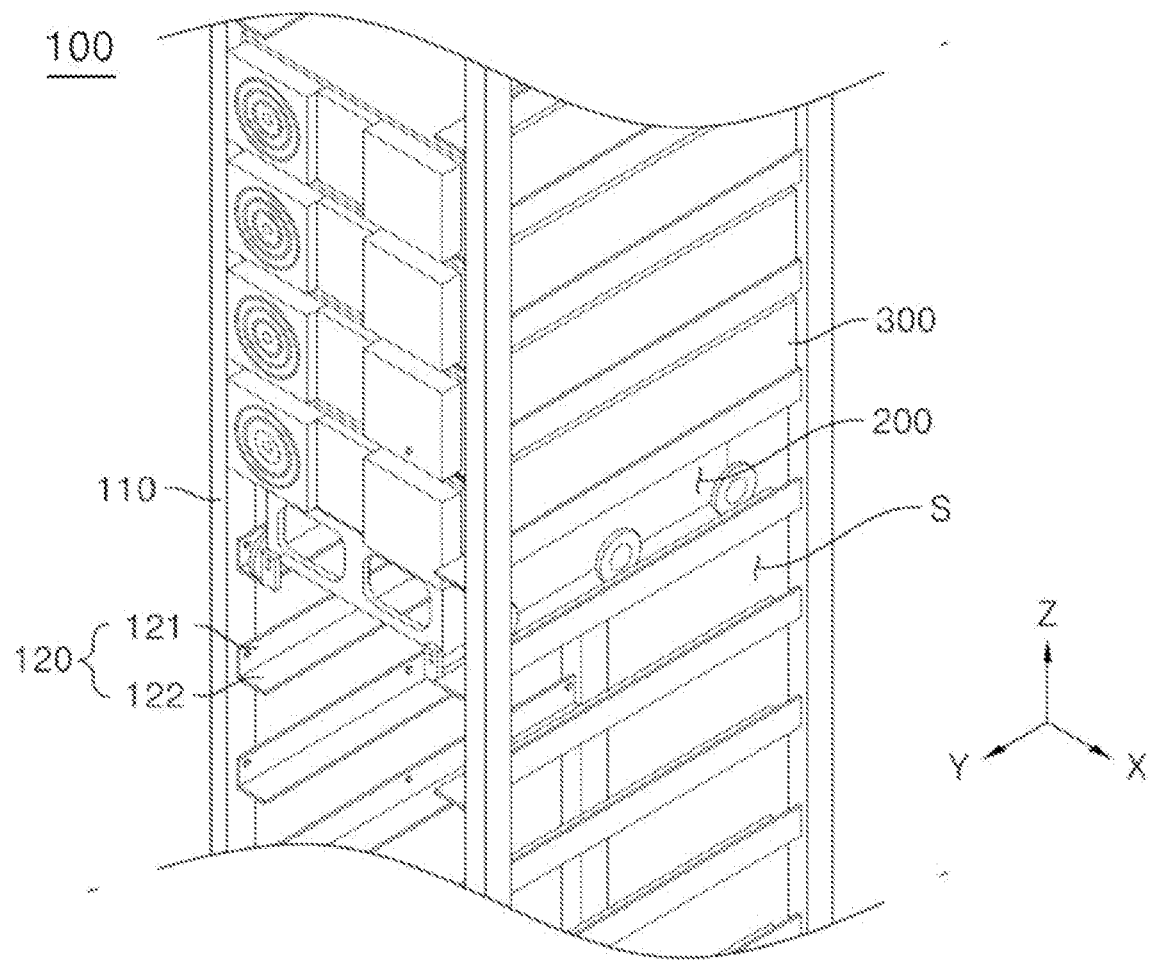
[FIG. 3]
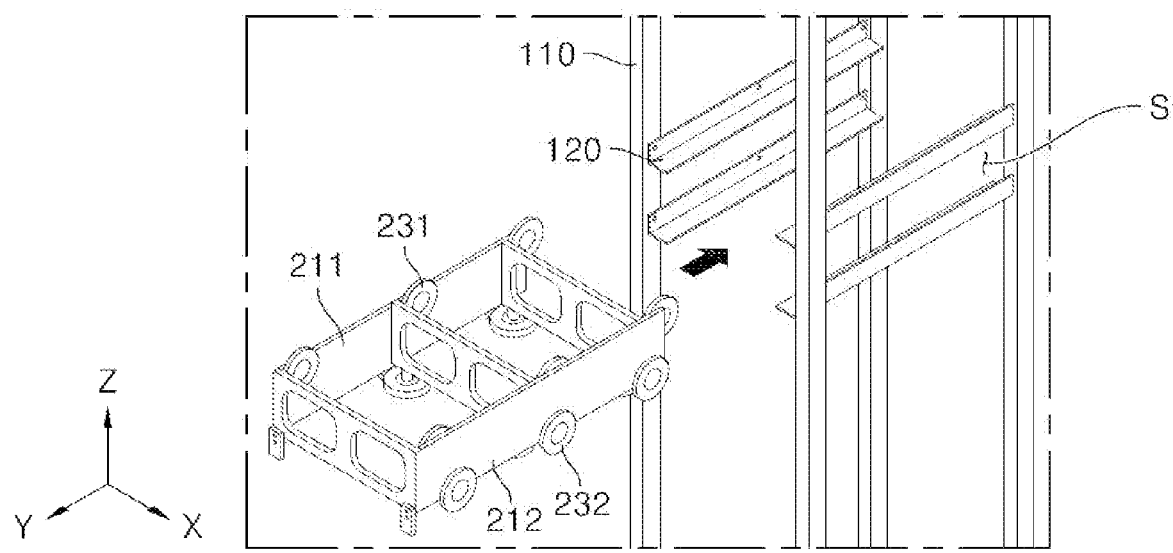

[FIG. 4]
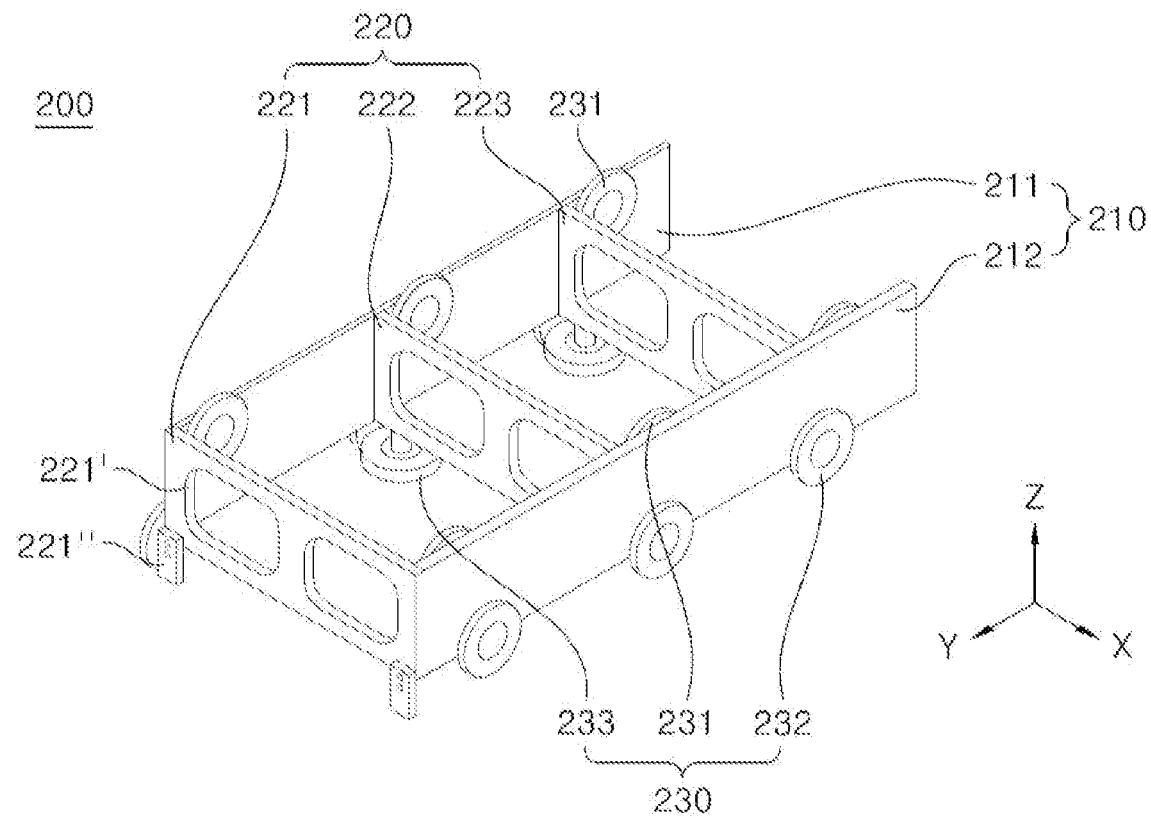
[FIG. 5]
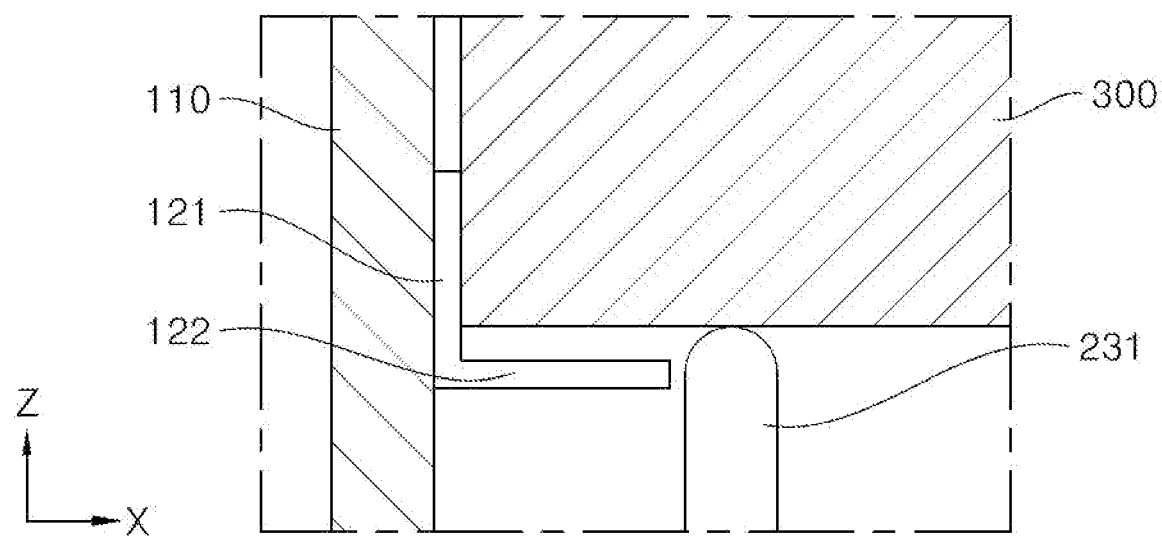

[FIG. 6]
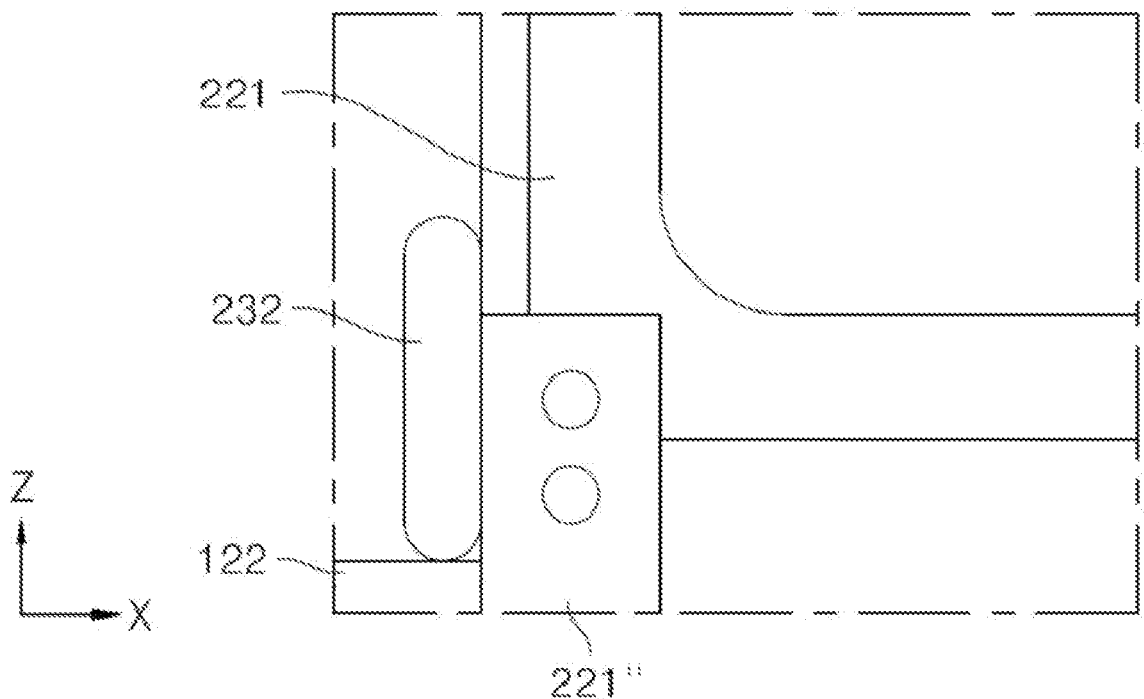
[FIG. 7]
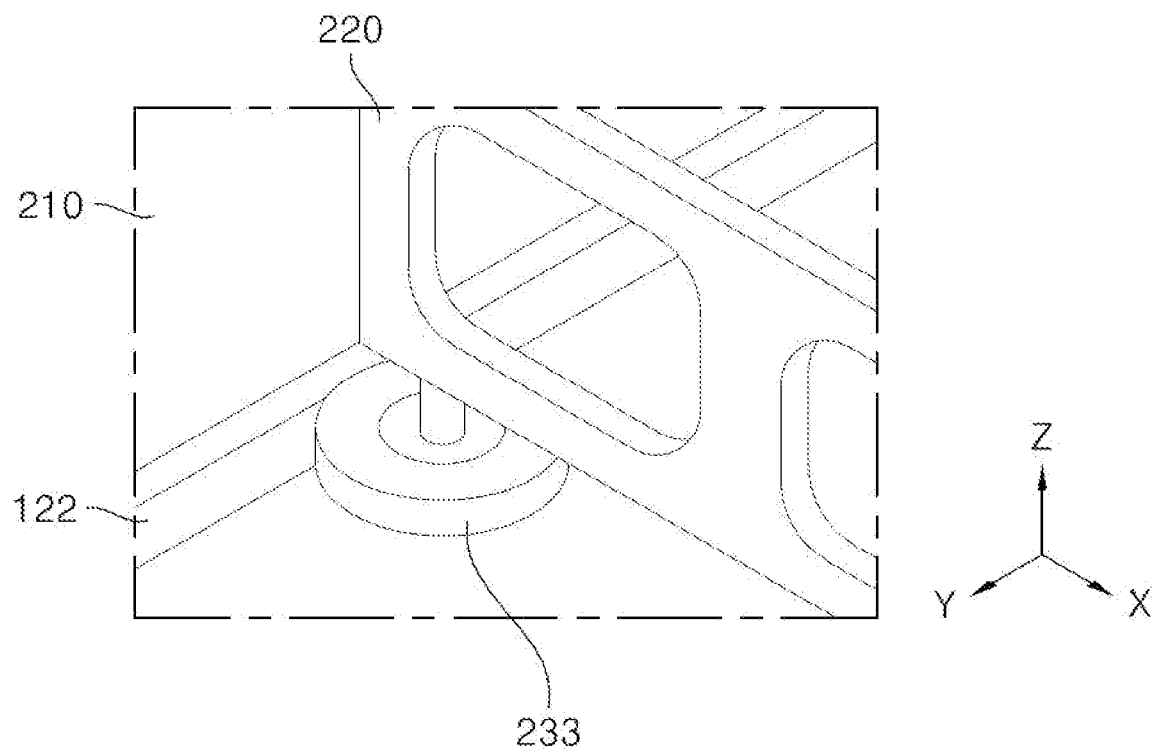

TRANSFER JIG CONFIGURED TO LOAD BATTERY PACK IN BATTERY RACK AND BATTERY PACK LOADING METHOD USING THE SAME

TECHNICAL FIELD

This application claims the benefit of priority to Korean Patent Application No. 2020-0036003 filed on Mar. 25, 2020, the disclosure of which is hereby incorporated by reference herein its entirety.

The present invention relates to a transfer jig configured to load a battery pack in a battery rack and a battery pack loading method using the same, and more particularly to a transfer jig configured to load a battery pack, wherein the transfer jig is provided with a plurality of rollers, whereby it is possible to minimize friction to thus improve workability when the battery pack is loaded in a battery rack, and a battery pack loading method using the same.

BACKGROUND ART

Secondary batteries, which have high applicability to products and electrical properties, such as high energy density, have generally been used in electric vehicles (EV) or hybrid electric vehicles (HEV), each of which is driven using an electrical driving source, as well as portable devices. Such secondary batteries have attracted attention as a new energy source capable of increasing environmental friendliness and energy efficiency, since no by-products are generated as the result of use of energy in addition to a primary advantage in that it is possible to remarkably reduce the use of fossil fuels.

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.5V to 4.5V. In the case in which output voltage higher than the above operating voltage is required, therefore, a plurality of battery cells may be connected to each other in series to constitute a battery pack.

In addition, a plurality of battery cells may be connected to each other in parallel depending on required charge and discharge capacities of a battery pack in order to constitute the battery pack. Consequently, the number of battery cells included in the battery pack may be variously set depending on required output voltage or charge and discharge capacities.

Meanwhile, in the case in which a plurality of battery cells is connected to each other in series/parallel to constitute a battery pack, a battery module including at least one battery cell may be manufactured first, and a battery pack may be manufactured using at least one battery module and other components, which is a general method. Here, a battery pack including at least one battery module may be provided for home use, or battery racks including at least one battery pack may be combined to constitute an energy storage system for industrial use, depending on various required voltage and capacity conditions.

Conventionally, when loading a battery pack in a battery rack, a worker forcibly pushes the battery pack so as to be received in the battery rack. The battery pack may have various weights. As an example, in the case in which the weight of one battery pack is 80 kg, the worker may easily feel fatigue, since it is necessary for the worker to exert much effort in order to insert the battery pack. In addition, friction may occur between a receiving space support of the battery rack and the battery pack, whereby the battery pack may become defective.

FIG. 1 is a perspective view illustrating conventional insertion of a battery pack. Referring to FIG. 1, a battery pack 10 is inserted into a battery rack 20 configured to receive the battery pack 10 in a wrapping state. A plurality of rollers 21 is formed at the battery rack 20, whereby it is possible to insert the battery pack into the battery rack without friction. In addition, a first protrusion 11 is formed on the battery pack 10, and a second protrusion 22 configured to engage with the first protrusion 11 in order to fix the first protrusion is formed on the battery rack 20. The battery pack is inserted into the battery rack and is fixed to constitute a power storage system.

In the above conventional construction, however, the volume of a product is increased due to formation of the rollers 21, and the rollers 21 must be formed in every space in which the battery pack 10 is received, whereby manufacturing costs are increased.

PRIOR ART DOCUMENT (Patent Document 1) Korean Patent Application Publication No. 2016-0094235

DISCLOSURE

Technical Problem

The present invention has been made in view of the above problems, and it is an object of the present invention to provide a transfer jig capable of reducing the force of friction between a battery pack and a battery rack when the battery pack is inserted into the battery rack, whereby it is possible to load the battery pack with small force, and a battery pack loading method using the same.

It is another object of the present invention to provide a transfer jig capable of reducing fatigue of a worker and shortening work time, whereby it is possible to improve work efficiency, and a battery pack loading method using the same.

Technical Solution

In order to accomplish the above objects, the present invention provides a transfer jig (200) configured to load a plurality of battery packs (300) in a battery rack, the battery rack including a plurality of vertical frames (110) spaced apart from each other by a predetermined distance and a plurality of L-shaped horizontal frames (120) located spaced apart from each other by a predetermined distance in a height direction of each of the vertical frames (110) so as to form a receiving space (S) configured to allow each of the battery packs (300) to be received therein, wherein the transfer jig (200) includes a pair of side frames (210) spaced apart from each other by a predetermined distance; a plurality of front frames (220) located perpendicular to the side frames (210); and a plurality of guide rollers (230).

Also, in the transfer jig according to the present invention, the side frames (210) may include a first side frame (211) and a second side frame (212), and the front frames (220) may include a first front frame (221), a second front frame (222), and a third front frame (223) sequentially located from the front surface of the transfer jig.

Also, in the transfer jig according to the present invention, the guide rollers (230) may include a plurality of first guide rollers (231) vertically located at an inside upper part of each of the side frames (210) and a plurality of second guide rollers (232) vertically located at an outside lower part of each of the side frames (210).

Also, in the transfer jig according to the present invention, the guide rollers (230) may further include a plurality of third guide rollers (233) located under the front frames (220) and parallel to the ground.

Also, in the transfer jig according to the present invention, the first front frame (221) may be provided with at least one incision portion (221').

Also, an energy storage system may include the battery rack, the plurality of vertical frames and the plurality of L-shaped horizontal frames, the transfer jig according to the present invention, each of the horizontal frames (120) may include a vertical support portion (121) fixed to the vertical frames (110) and a horizontal support portion (122) configured to allow the battery pack (300) to be seated thereon, and each of the first guide rollers (231) may be located inside the horizontal support portion (122) while protruding a predetermined height more than the horizontal support portion (122) such that the battery pack (300) is not brought into contact with the horizontal support portion (122).

Also, in the transfer jig according to the present invention, the third guide rollers (233) may be configured to be moved along an inner end of the horizontal support portion (122).

Also, in the energy storage system according to the present invention, an extension portion (221") at each lower corner of the first front frame may extend downwards by a predetermined length more than the horizontal support portion (122).

In addition, a loading method using the transfer jig according to the present invention includes a first step of inserting the transfer jig (200) into the receiving space (S) along the horizontal frames (120); a second step of inserting a battery pack (300) along the upper surface of the transfer jig (200); and a third step of removing the transfer jig (200) from the battery rack (100).

Also, in the loading method using the transfer jig according to the present invention, the transfer jig may be inserted along horizontal frames (120) located under the receiving space in which the battery pack (300) is to be seated in the first step.

Also, in the loading method using the transfer jig according to the present invention, the battery packs may be sequentially loaded from the upper part of the battery rack 110.

Advantageous Effects

A transfer jig configured to load a battery pack in a battery rack according to the present invention includes first guide rollers, on which the battery pack is seated, whereby it is possible to move and load the battery pack without a separate transfer device.

In addition, the transfer jig according to the present invention includes second guide rollers, whereby it is possible to very easily mount or remove the transfer jig in or from the battery rack.

Furthermore, the transfer jig according to the present invention includes third guide rollers, whereby it is possible to prevent the transfer jig from shaking leftwards and rightwards during sliding thereof forwards and rearwards, whereby it is possible to improve safety and accuracy in work.

DESCRIPTION OF DRAWINGS

FIG. 1 is a perspective view illustrating loading of a battery pack in a conventional battery rack.

FIG. 2 is a perspective view showing the state in which a transfer jig is coupled to a battery rack according to a preferred embodiment of the present invention.

FIG. 3 is a perspective view illustrating movement of a transfer jig according to a preferred embodiment of the present invention.

FIG. 4 is a perspective view of the transfer jig according to the preferred embodiment of the present invention.

FIG. 5 is an enlarged view of a first guide roller of the transfer jig according to the preferred embodiment of the present invention configured to be brought into tight contact with the lower surface of a battery pack.

FIG. 6 is an enlarged view of a second guide roller of the transfer jig according to the preferred embodiment of the present invention configured to be brought into tight contact with a horizontal frame of the battery rack.

FIG. 7 is an enlarged view of a third guide roller of the transfer jig according to the preferred embodiment of the present invention configured to be brought into tight contact with the horizontal frame of the battery rack.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a transfer jig configured to load a battery pack in a battery rack according to the present invention and a loading method using the same will be described with reference to the accompanying drawings.

FIG. 2 is a perspective view showing the state in which a transfer jig is coupled to a battery rack according to a preferred embodiment of the present invention.

Referring to FIG. 2, the battery rack 100 according to the present invention includes a vertical frame 110 and a horizontal frame 120.

A plurality of vertical frames 110, e.g. four vertical frames, may be provided so as to be spaced apart from each other by a predetermined distance in order to support corners of a battery pack having an approximately hexahedral shape. However, the number of the vertical frames may be changed, as needed. For example, six vertical frames may be provided.

The horizontal frame 120 is located inside the vertical frame 110 so as to receive a plurality of battery packs in multiple stages. Specifically, the horizontal frame 120 includes a vertical support portion 121 fixed to the inner surface of the vertical frame 110 and a horizontal support portion 122 extending perpendicularly from the lower edge of the vertical support portion 121, whereby the horizontal frame has an approximately L-shape.

A plurality of horizontal frames 120, each of which is configured as described above, is provided so as to be spaced apart from each other by a predetermined distance in a height direction of the vertical frame 120 such that the lower edge of the battery pack 300 is supported by a receiving space S configured to receive the battery pack 300 therein, i.e. a pair of horizontal support portions 122 that face each other.

Here, the battery pack 300 includes a plurality of unit modules, and each unit module includes one or more battery cells connected to each other in series or in parallel. The battery cell, the unit module, and the battery pack are general constructions, and therefore a detailed description thereof will be omitted.

Meanwhile, although not shown in the figures, a controller configured to control and manage the battery packs received in the battery rack 100 may be further received in an uppermost, middle, or lower receiving space of the battery rack.

FIG. 3 is a perspective view illustrating movement of a transfer jig according to a preferred embodiment of the present invention, and FIG. 4 is a perspective view of the transfer jig according to the preferred embodiment of the present invention.

The transfer jig 200 according to the present invention is detachably mounted in the receiving space of the battery rack 100 in a slide fashion. When the battery pack. 300 is loaded, the transfer jig 200 is mounted first in the receiving space, and then the battery pack 300 is moved to the upper surface of the transfer jig 200. Consequently, the transfer jig 200 is configured to have a structure capable of easily moving the battery pack 300 while being slidable.

As shown in FIG. 4, the transfer jig 200 according to the present invention includes a side frame 210, a front frame 220, and a plurality of guide rollers 230.

First, the side frame 210 includes a pair of side frames, i.e. a first side frame 211 and a second side frame 212, located in a vertical direction in a state of being spaced apart from each other by a predetermined distance. The first side frame 211 supports one side of the battery pack 300 in a longitudinal direction (Y-axis direction), and the second side frame 212 supports the other side of the battery pack 300.

The front frame 220 located perpendicular to the side frame 210 serves to connect the first side frame 211 and the second side frame 212 to each other. As an illustration, the front frame may include a first front frame 221, a second front frame 222, and a third front frame 223, when viewed from the front (the left in FIG. 4).

The first front frame 221 may be located at front edges of the pair of side frames 210, the third front frame 223 may be located at rear edges of the side frames 210, and the second front frame 222 may be located at the middles of the side frames 210.

Here, it is preferable for at least one incision portion 221' to be formed in the first front frame 221. The reason for this is that the incision portion is capable of serving as a handle that a worker can grip when mounting or separating the transfer jig 200 in or from the receiving space of the battery rack 100 and that the incision portion is capable of being utilized as a see-through window, through which the worker can check whether the battery pack 300 seated in the transfer jig 200 is properly moved in a predetermined direction, whereby it is possible to guarantee ease and safety in work.

Extension portions 221", each of which extends downwards by a predetermined length, are formed at opposite sides of the lower edge of the first front frame 221. The extension portions are provided to prevent excessive insertion of the transfer jig 200 when the transfer jig is mounted in the receiving space of the battery rack 100. That is, the extension portions are provided to prevent the transfer jig 200, which is slid forwards and rearwards along the horizontal frame 120, from being dropped at the rear of the battery rack 100. The lower ends of the extension portions 221" are caught by the horizontal support portions 122, whereby the transfer jig is prevented from being further moved rearwards.

It is preferable for at least one incision portion 221' to also be formed in each of the second front frame 222, located at the middles of the pair of side frames 210, and the third front frame 223, located at the rear edges of the side frames 210, but the present invention is not limited thereto. However, it is desirable to provide the incision portion if possible, since the incision portion is useful for reducing the weight of the transfer jig, reducing material costs, and checking whether the battery pack 300 has been loaded.

Although three front frames are shown in the figure, which is merely one illustration, it is obvious that the number of the front frames may be changed.

Next, the guide rollers 230 will be described. The guide rollers 230 include a first guide roller 231, a second guide roller 232, and a third guide roller 233.

FIG. 5 is an enlarged view of the first guide roller of the transfer jig according to the preferred embodiment of the present invention configured to be brought into tight contact with the lower surface of the battery pack. Referring to FIGS. 4 and 5, three first guide rollers 231 are provided at the inside upper part of each of the first side frame 211 and the second side frame 212.

The first guide rollers 231 perform the function of easily moving the battery pack 300 seated in the upper part of the transfer jig 200. That is, the battery pack 300 is seated on the six first guide rollers 231. Consequently, it is possible for the worker alone to move the battery pack 300 without a separate transfer device, and it is not necessary for the worker to exert much effort in order to move the battery pack, whereby it is possible to contribute to reduction of worker fatigue and shortening of work time.

Here, the seated battery pack 300 must be supported by only the first guide rollers 231 in order to prevent friction with the battery rack 100. Consequently, the uppermost end of each of the first guide rollers 231 must protrude so as to be slightly higher than the horizontal support portion 122 of the battery rack 100.

Although six first guide rollers 231 are shown in the figure, which is merely one illustration, it is obvious that the number of the first guide rollers may be changed.

FIG. 6 is an enlarged view of the second guide roller of the transfer jig according to the preferred embodiment of the present invention configured to be brought into tight contact with the horizontal frame of the battery rack. Referring to FIGS. 4 and 6, three second guide rollers 232 are provided at the outside lower part of each of the first side frame 211 and the second side frame 212.

The second guide rollers 232 perform the function of easily moving the transfer jig 200. In order to receive a plurality of battery packs 300 in the battery rack 100, it is necessary to repeatedly mount or detach the transfer jig 200 to or from the battery rack to that extent. Consequently, it is preferable for the worker alone to perform attachment and detachment without a separate attachment and detachment device.

To this end, the second guide rollers 232 are provided outside the first side frame 211 and the second side frame 212 so as to be slidable in tight contact with the horizontal support portions 122.

Here, the lowermost end of each of the second guide rollers 232 protrudes downwards slightly more than the lower edge of the side frame 210 so as to minimize friction with the battery rack 100.

Although six second guide rollers 232 are shown in the figure, which is merely one illustration, it is obvious that the number of the second guide rollers may be changed.

FIG. 7 is an enlarged view of the third guide roller of the transfer jig according to the preferred embodiment of the present invention configured to be brought into tight contact with the horizontal frame of the battery rack.

Referring to FIGS. 4 and 7, a plurality of third guide rollers 233, which is physically connected to the front frame 220, is located under the front frame 220 in a state of being parallel to the ground. When the transfer jig 200 is moved forwards and rearwards along the horizontal frame 120, the third guide rollers 233 are moved in a state of being in tight contact with the inner ends of the horizontal support portions 122. Consequently, it is possible to prevent the transfer jig 200 from shaking leftwards and rightwards during sliding thereof, whereby it is possible to improve safety and accuracy in work.

Although two third guide rollers 233 are shown as being provided at each of the second front frame 222 and the third front frame 223 in the figure, it is obvious that the third guide rollers may also be provided at the first front frame 221.

Next, a method of loading a plurality of battery packs 300 in the battery rack 100 using the transfer jig 200 will be described with reference to FIG. 3.

The battery pack loading method according to the present invention includes a first step of inserting the transfer jig 200 into the receiving space S along the horizontal frame 120, a second step of moving a battery pack 300 along the upper surface of the transfer jig 200, and a third step of removing the transfer jig 200 from the battery rack 100.

In the first step, which is a step of inserting the transfer jig 200 under a receiving space in which the battery pack 300 is to be received, the second guide rollers 232 of the transfer jig 200 are seated on the pair of horizontal support portions 122, and then the transfer jig is pushed into the receiving space.

In the second step, a portion of the battery pack 300 is seated on the upper part of the transfer jig 200 moved into the receiving space, i.e. on the first guide rollers 231, and then the battery pack 300 is pushed into the receiving space until the battery pack reaches a predetermined position.

In the third step, the transfer jig 200 is removed from the receiving space S in order to mount another battery pack 300 under the battery pack 300 received in the second step.

Subsequently, the first step to the third step are repeatedly performed in order to receive a desired number of battery packs 300 in the battery rack 100.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Battery rack
110: Vertical frame
120: Horizontal frame
121: Vertical support portion
122: Horizontal support portion
200: Transfer jig
210: Side frame
211: First side frame
212: Second side frame
220: Front frame
221: First front frame
221': Incision portion
221": Extension portion
222: Second front frame
223: Third front frame
230: Guide roller
231: First guide roller
232: Second guide roller
233: Third guide roller
300: Battery pack
S: Receiving space

The invention claimed is:

1. A transfer jig configured to load a plurality of battery packs in a battery rack, the battery rack comprising a plurality of vertical frames spaced apart from each other by a predetermined distance and a plurality of L-shaped horizontal frames located spaced apart from each other by a predetermined distance in a height direction of each of the vertical frames so as to form a receiving space configured to allow each of the battery packs to be received therein, the transfer jig comprising:
a pair of side frames spaced apart from each other by a predetermined distance;
a plurality of front frames located perpendicular to the side frames; and
a plurality of guide rollers attached to the pair of side frames, each of the guide rollers having a diameter less than a height of the pair of side frames,
wherein the plurality of guide rollers comprise a plurality of first guide rollers extending above a top edge of the pair of side frames and a plurality of second guide rollers extending below a bottom edge of the pair of side frames.

2. The transfer jig according to claim 1, wherein the side frames comprise a first side frame and a second side frame, and
wherein the front frames comprise a first front frame, a second front frame, and a third front frame sequentially located from a front surface of the transfer jig.

3. The transfer jig according to claim 2, wherein the plurality of first guide rollers are attached to an inner surface of each of the side frames to be inside the transfer jig and the plurality of second guide rollers are attached to an outer surface of each of the side frames to be outside the transfer jig.

4. The transfer jig according to claim 3, wherein the guide rollers further comprise a plurality of third guide rollers located under the bottom edge of the pair of side frames and having a vertical axis of rotation.

5. The transfer jig according to claim 4, wherein the third guide rollers are configured to be moved along an inner end of the horizontal support portion.

6. The transfer jig according to claim 2, wherein the first front frame is provided with at least one incision portion.

7. An energy storage system, comprising:
the battery rack comprising the plurality of vertical frames and the plurality of L-shaped horizontal frames; and
the transfer jig according to claim 1, wherein each of the horizontal frames comprises a vertical support portion fixed to the vertical frames and a horizontal support portion configured to allow the battery pack to be seated thereon, and wherein each of the first guide rollers is located inside the horizontal support portion while protruding a predetermined height more than the horizontal support portion such that the battery pack is not brought into contact with the horizontal support portion.

8. The energy storage system according to claim 7, further comprising an extension portion at each lower corner of the first front frame extending downwards by a predetermined length more than the horizontal support portion.

9. A method of loading a plurality of battery packs in a battery rack using the transfer jig according to claim 1, the method comprising:
   a first step of inserting the transfer jig into the receiving space along the horizontal frames;
   a second step of inserting a battery pack along an upper surface of the transfer jig; and
   a third step of removing the transfer jig from the battery rack.

10. The method according to claim 9, wherein, in the first step, the transfer jig is inserted along horizontal frames located under the receiving space in which the battery pack is to be seated.

11. The method according to claim 10, wherein the battery packs are sequentially loaded from an upper part of the battery rack.

\* \* \* \* \*